UNITED STATES PATENT OFFICE.

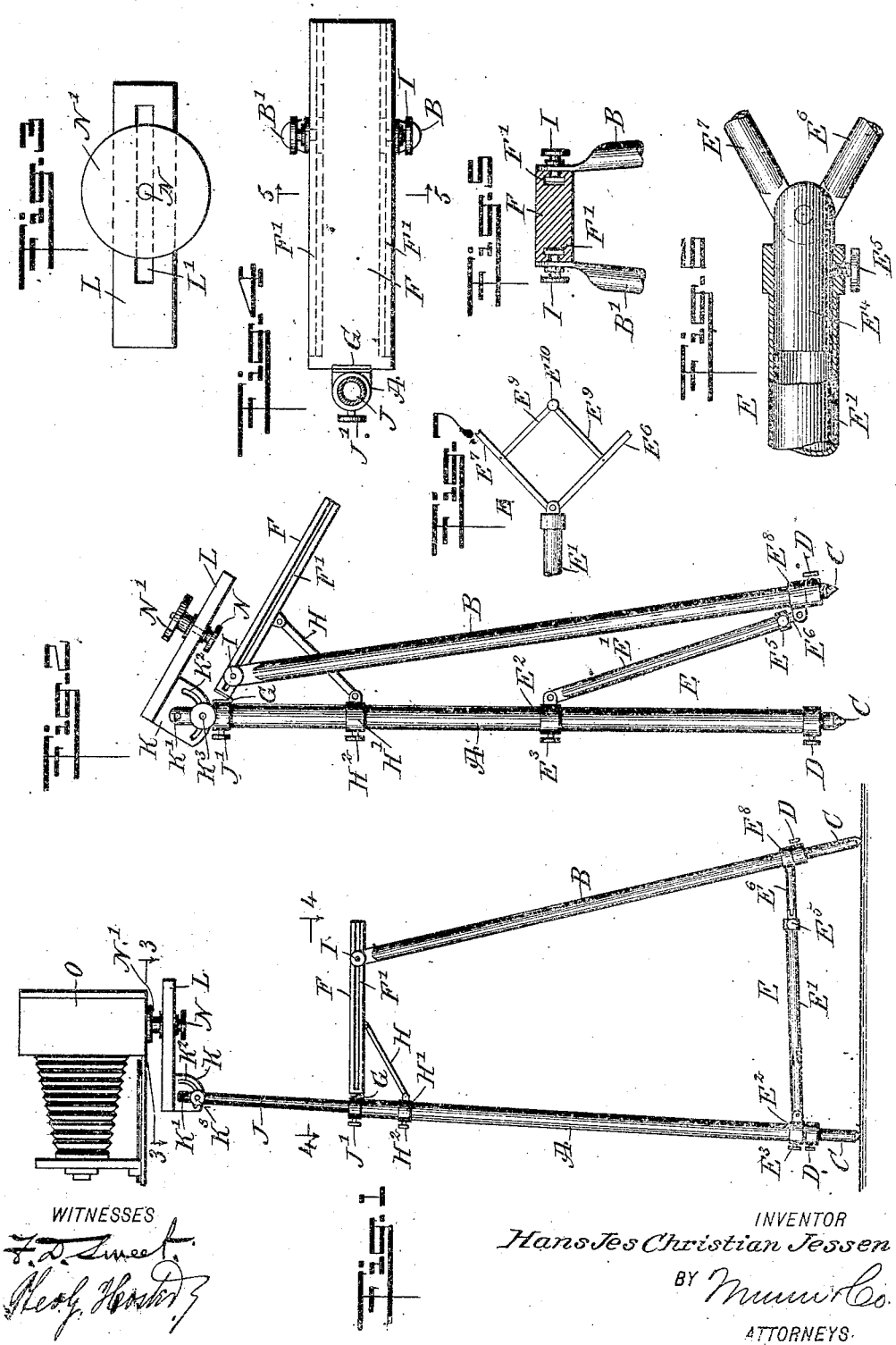

HANS JES CHRISTIAN JESSEN, OF NEVADA, IOWA.

TRIPOD.

No. 898,374.  Specification of Letters Patent.  Patented Sept. 8, 1908.

Application filed April 22, 1908. Serial No. 428,496.

*To all whom it may concern:*

Be it known that I, HANS JES CHRISTIAN JESSEN, a citizen of the United States, and a resident of Nevada, in the county of Story and State of Iowa, have invented a new and Improved Tripod, of which the following is a full, clear, and exact description.

The object of the invention is to provide a new and improved tripod for supporting cameras, telescopes, transits, gun-rests, etc., and arranged to permit of firmly setting the tripod on uneven ground or rocks, to allow convenient adjustment of the members of the tripod to bring the article to be supported into the desired position, and to permit of folding the tripod into a comparatively small space for carrying it from place to place.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement, set up and shown as supporting a camera; Fig. 2 is a side elevation of the improvement partly folded up; Fig. 3 is an enlarged plan view of the improvement, the camera being removed; Fig. 4 is a sectional view on the line 4—4 of Fig. 1; Fig. 5 is a transverse section of the improvement on the line 5—5 of Fig. 4; Fig. 6 is an enlarged sectional plan view of the bottom brace for the legs; and Fig. 7 is a reduced plan view of the same.

The main leg A and the two auxiliary legs B, B' are preferably made tubular, and are provided at their lower ends with telescoping points C, adapted to be fastened in place in the legs by set screws D, as plainly indicated in Figs. 1 and 2. The legs A, B and B' are connected with each other by a bottom brace E formed of a tubular rod E' pivotally connected at one end to a sleeve $E^2$ mounted to slide on the main leg A and adapted to be secured thereto by a set screw $E^3$. In the free end of the tube E' is mounted to slide a rod $E^4$, adapted to be fastened in place by a set screw $E^5$, and on the said rod $E^4$ are pivoted the rods $E^6$, $E^7$, pivoted to sleeves $E^8$, held on the lower ends of the auxiliary legs B and B'. Now by the arrangement described, the sleeve $E^2$, on loosening the set screw $E^3$, can be moved up on the leg A, to allow of folding the legs B and B' towards the leg A, as indicated in Fig. 2, the rods $E^6$, $E^7$ with the rod $E^4$ being free to slide in the tube E' on loosening the set screw $E^5$. In order to lock the rods $E^6$, $E^7$ when spread in any desired point, locking links $E^9$ are provided, see Fig. 7, and fulcrumed on the rods $E^6$, $E^7$, and fastened together by a clamping screw $E^{10}$.

An arm F is connected by a hinge G to the upper end of the main leg A, and the under side of this arm F is connected by a brace H, with a sleeve H', mounted to slide on the main leg A and adapted to be secured thereon by a set screw $H^2$. Thus on loosening the set screw $H^2$, the arm F is free to swing towards or from the leg A.

In the sides of the arm F are formed longitudinally-extending guideways F', (see Figs. 1, 2, 4 and 5), engaged by clamping screws I, pivotally engaged by the upper ends of the auxiliary legs B and B', to permit of adjusting the said upper ends of the legs B and B' lengthwise on the arm F, to suit the condition of the ground on which the tripod is to be mounted.

In the upper end of the main leg A telescopes a rod J, adapted to be fastened in place by a set screw J', and on the upper end of the said rod J is pivoted at K' a quadrant K, attached to and forming part of a table L, the quadrant K being provided with a segmental slot $K^2$, engaged by a clamping screw $K^3$ held on the rod J, to fasten the quadrant K and consequently the table L in any desired position.

The table L is provided with a lengthwise-extending slot L', engaged by a clamping screw N, passing through a platform N' and screwing into a nut on the camera O or other article to be supported, the camera resting on the platform N', as plainly indicated in Fig. 1. By the arrangement described the table L and with it the camera O carried thereby can be swung into any position, to bring the camera O or like article into the desired position. On loosening the set screw J' the rod J, and with it the table L, platform N' and camera O, can be turned in any desired direction.

When it is desired to fold the tripod, the table L is swung downward and the rod J is telescoped in the leg A, and the auxiliary legs B, B' are folded up, as previously mentioned and shown in Fig. 2, by loosening the clamping screws I and the set screws $E^3$, $E^5$, to swing the arm F downward and the brace E upward, as indicated in said Fig. 2. By the arrangement described the tripod can be folded into a comparatively small space for conveniently carrying the tripod from place to place.

It will also be noticed that the construction above set forth and illustrated in the drawings, provides an exceedingly strong and durable tripod, which can be readily adjusted to suit uneven or rocky ground, and to bring the camera or other article into the desired position.

Having thus described my invention, I claim as new and desire to secure by Letters Patent:

1. A tripod having connected legs connected at their tops, of which one is provided with an adjustable telescoping extension at its upper end, a table pivoted on the said extension, and means for securing the table in adjusted position.

2. A tripod having connected legs, of which one is provided with an adjustable telescoping extension, a table pivoted on the said extension and having a quadrant, and a clamping screw on the said extension engaging the said quadrant.

3. A tripod having connected legs, of which one is provided with an adjustable telescoping extension, a table pivoted on the said extension and provided with an elongated slot, a support held adjustably on the said table and provided with a clamping screw engaging the said slot, and means for securing the table in place on the extension.

4. A tripod comprising a main leg and auxiliary legs, an arm hinged on the said main leg and slidably engaged by the auxiliary legs, and a bottom brace connecting the legs with each other.

5. A tripod comprising a main leg and auxiliary legs, an arm hinged on the said main leg and slidably engaged by the auxiliary legs, an arm brace pivotally connected with the said arm, a collar slidably secured on the said main leg and pivotally connected with the said arm brace, and a bottom brace connecting the legs with each other.

6. A tripod comprising a main leg and auxiliary legs, an arm hinged on the said main leg and slidably engaged by the auxiliary legs, an arm brace pivotally connected with the said arm, a collar slidably secured on the said main leg and pivotally connected with the said arm brace, a bottom brace connecting the legs with each other, the said bottom brace comprising a sleeve adjustably held on the main leg, a tube pivoted with the said sleeve, branch rods pivotally connected with the said auxiliary legs, and a shank secured in the free end of the said tube and pivotally connected with the said rods.

7. A tripod having a main leg and auxiliary legs connected at their tops, an arm hinged on the main leg and slidably engaged by the auxiliary legs, said main leg being provided with an adjustable telescoping extension at its upper end, and a table adjustably mounted on the extension.

In testimony whereof I have signed my name to this specification in the presence of two subscribing witnesses.

HANS JES CHRISTIAN JESSEN.

Witnesses:
BERT B. WELTY,
H. E. HADLEY.